United States Patent
Jung et al.

(10) Patent No.: US 11,494,325 B2
(45) Date of Patent: Nov. 8, 2022

(54) COMMUNICATION MODULE, USER AND METHOD

(71) Applicant: Robert Bosch GmbH, Stuttgart (DE)

(72) Inventors: Ramona Jung, Stuttgart (DE); Arthur Mutter, Neuhausen (DE); Thomas Enderle, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/155,929

(22) Filed: Jan. 22, 2021

(65) Prior Publication Data
US 2021/0248095 A1 Aug. 12, 2021

(30) Foreign Application Priority Data
Feb. 10, 2020 (DE) .......................... 102020201606.2

(51) Int. Cl.
*G06F 13/20* (2006.01)
*G05D 1/00* (2006.01)
*G06F 13/42* (2006.01)

(52) U.S. Cl.
CPC ........... *G06F 13/20* (2013.01); *G05D 1/0016* (2013.01); *G06F 13/4282* (2013.01)

(58) Field of Classification Search
CPC ........ G06F 13/20; G06F 13/42; G05D 1/0016
See application file for complete search history.

(56) References Cited

U.S. PATENT DOCUMENTS

| | | | |
|---|---|---|---|
| 2018/0109622 A1* | 4/2018 | Galula | H04L 67/12 |
| 2019/0005237 A1* | 1/2019 | Long | G06N 3/084 |
| 2019/0042738 A1* | 2/2019 | Juliato | G06F 21/554 |
| 2019/0044912 A1* | 2/2019 | Yang | H04L 63/02 |
| 2019/0191020 A1* | 6/2019 | Hamada | H04L 43/062 |
| 2019/0308589 A1* | 10/2019 | Maluf | B60R 25/1004 |
| 2019/0334932 A1* | 10/2019 | Nuqui | H04L 63/20 |
| 2019/0342115 A1* | 11/2019 | Lieder | H04L 43/08 |
| 2021/0107397 A1* | 4/2021 | Unterweger | H05B 47/115 |

* cited by examiner

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A communication module for a user of a serial bus. The communication module is configured to receive a first message stream, encompassing a multitude of messages, via a first interface, and to provide a respective message of the first message stream as a message of a second message stream, as a function of a configuration state and as a function of at least one property of the respective message of the first message stream, via a second interface.

17 Claims, 4 Drawing Sheets

COMMUNICATION MODULE, USER AND METHOD

CROSS REFERENCE

The present application claims the benefit under 35 U.S.C. § 119 of German Patent Application No. 102020201606.2 filed on Feb. 10, 2020, which is expressly incorporated herein by reference in its entirety.

FIELD

The present invention relates to a communication module for a user of a serial bus, to a user of a serial bus, and to a method for operating a communication module of a serial bus.

BACKGROUND INFORMATION

In CAN networks, users are able to send the messages defined for and assigned to them at arbitrary points in time. A receiving user checks to what extent the communication on the bus corresponds to a static communication matrix which was specified at the time of development. This means that a user includes a filter which filters out the messages which are relevant for the user and are accordingly specified. If a message is not included in this matrix, it is discarded.

Refinements of the CAN are specified to that effect by meeting the requirements of new technologies and business models. Use cases such as, e.g., autonomous driving, over-the-air updates and the enhancement of the driving sensation have increased requirements with regard to the vehicle communication with respect to, for example, a high data rate, despite minor latency periods. In contrast to the static configuration of the communication dominating in the vehicle thus far, flexible and dynamic communication models are necessary to satisfy the requirements of the future use cases. For example, additional protocols (e.g., Ethernet) are to be transmitted via CAN, which are able to implement this dynamic and flexibility. Due to the new use cases, additionally an increased connectivity of the vehicle network to external systems exists, among other things the cloud. This results in an increased risk of cyber attacks on the vehicle. In particular, Ethernet and service-oriented communication are based on the concept that communication channels may be established or terminated during the run time. Only after a communication channel has been established may it be possible to receive a certain service or to provide the service.

SUMMARY

An object of the present invention may be achieved by example embodiments of a communication module, a user (subscriber), and a method. Advantageous refinements are described herein and are shown in the figures.

According to a first aspect of the present invention, a communication module for a user of a serial bus is provided. In accordance with an example embodiment of the present invention, the communication module is configured to receive a first message stream, encompassing a multitude of messages, via a first interface, and to provide a respective message of the first message stream as a message of a second message stream, as a function of a configuration state and as a function of at least one property of the respective message of the first message stream, via a second interface.

Consequently, all other messages of the first message stream are blocked depending on the state. In this way, a dynamic adaptation of a filtering of the outgoing and/or incoming network traffic to the configuration state is made possible.

In contrast to existing filter mechanisms, a dynamic check of the communication is thus possible: Depending on the state, the communication may be allowed to pass or be prevented.

The user is enabled by the provided communication module to block or to allow communication in the vehicle or in the user based on a certain state. For example, communication which is definitely permitted, such as the reception of a diagnostic message, may thus be blocked during normal driving operation, but may be permitted during a diagnosis. In this way, it is possible to block erroneous messages, for example caused by possible misconfigurations or targeted cyber attacks, and in particular not only based on a static, predefined matrix, but based on a certain state, i.e., in certain situations or at certain points in time.

In an advantageous example embodiment of the present invention, the communication module is configured to ascertain a forwarding indicator per message of the first message stream, as a function of the configuration state of the communication module and as a function of the at least one property of the respective message, with the aid of a configuration unit, and to only provide the respective message of the first message stream as a message of the second message stream when the forwarding indicator indicates this provision.

The ascertainment of the forwarding indicator thus represents a positively defined indication for the messages to be forwarded.

In an advantageous example embodiment of the present invention, the communication module is configured to receive the configuration state of the communication module from a control unit.

The advantage of receiving the configuration state from a control unit is the flexibility as a result of user- or host-specific definitions of the state. In other words, a function superordinate to the communication module has the control over the communication state of the communication module. As a result of a valid application-specific configuration state, it becomes possible that the filtering capability of the communication module is adaptable, for example, by an application.

In an advantageous example embodiment of the present invention, the communication module is configured to receive a message which encompasses at least one activation indicator, and to ascertain the configuration state of the communication module as a function of the at least one activation indicator with the aid of a state management unit.

Advantageously, the direct influencing of the configuration state is suppressed. Rather, it is made possible that the configuration state changes by observing the messages provided via the first interface and by identifying the activation indicator.

In an advantageous example embodiment of the present invention, a multitude of configurations ascertained in advance are stored on a memory unit.

The configurations are advantageously ascertained in advance, as a result of which fixedly predefined filter criteria that cannot be manipulated during the run time or execution time of the communication module result for messages within the meaning of the configurations.

In an advantageous example embodiment of the present invention, a configuration encompasses a multitude of entries, which each positively define which at least one property of the message of the first message stream, in which configuration state, indicates a forwarding of a received message of the first message stream as a message of the second message stream.

Consequently, a whitelist filter is thus created, which blocks all messages other than those which apply to the activated configuration.

In an advantageous example embodiment of the present invention, the at least one property of the respective message includes an object identifier, which characterizes the content of the message.

Advantageously, the messages which have a content which is predetermined via the object identifier are then transmitted or received. During the reception or transmission, certain contents are thus positively defined by the property, which are allowed to pass in the one and/or the other direction(s). As a result, all non-defined contents of the messages are blocked, which enhances the security against attacks by third parties.

In an advantageous example embodiment of the present invention, the at least one property of the respective message encompasses a transport direction of the message.

If the consideration of the transport direction toward the bus causes certain messages to be blocked, it is possible that the other bus users are protected against a malicious behavior of the manipulated control unit assigned to the communication module.

On the other hand, a blocking of certain messages received from the bus protects the control unit assigned to the communication module against a malicious behavior of other bus users.

In an advantageous example embodiment of the present invention, the communication module is configured to receive the first message stream from a control unit, and to transmit the second message stream on the bus.

With this, the messages intended for transmission are filtered, and the other users of the bus are protected against a faulty behavior of the user since the messages generated in an accordingly faulty manner by an application, should they not be provided in the configuration, are blocked.

In an advantageous example embodiment of the present invention, the communication module is configured to receive the first message stream from the bus, and to transmit the second message stream to a or the control unit.

The user is advantageously protected against a faulty behavior of other users, which is not provided according to the selected configuration.

A second aspect of present invention relates to a user of a serial bus, in particular, a control unit for a motor vehicle, the user encompassing the communication module according to the first aspect.

A third aspect of the present invention relates to a method for operating a communication module of a user of a serial bus. In an example embodiment of the present invention, the method including: receiving, via a first interface, a first message stream encompassing a multitude of messages, and providing, with the aid of a second interface, a respective message of the first message stream as a message of a second message stream as a function of a configuration state and as a function of at least one property of the respective message of the first message stream.

DETAILED DESCRIPTION OF EXAMPLE EMBODIMENTS

Figure 1:
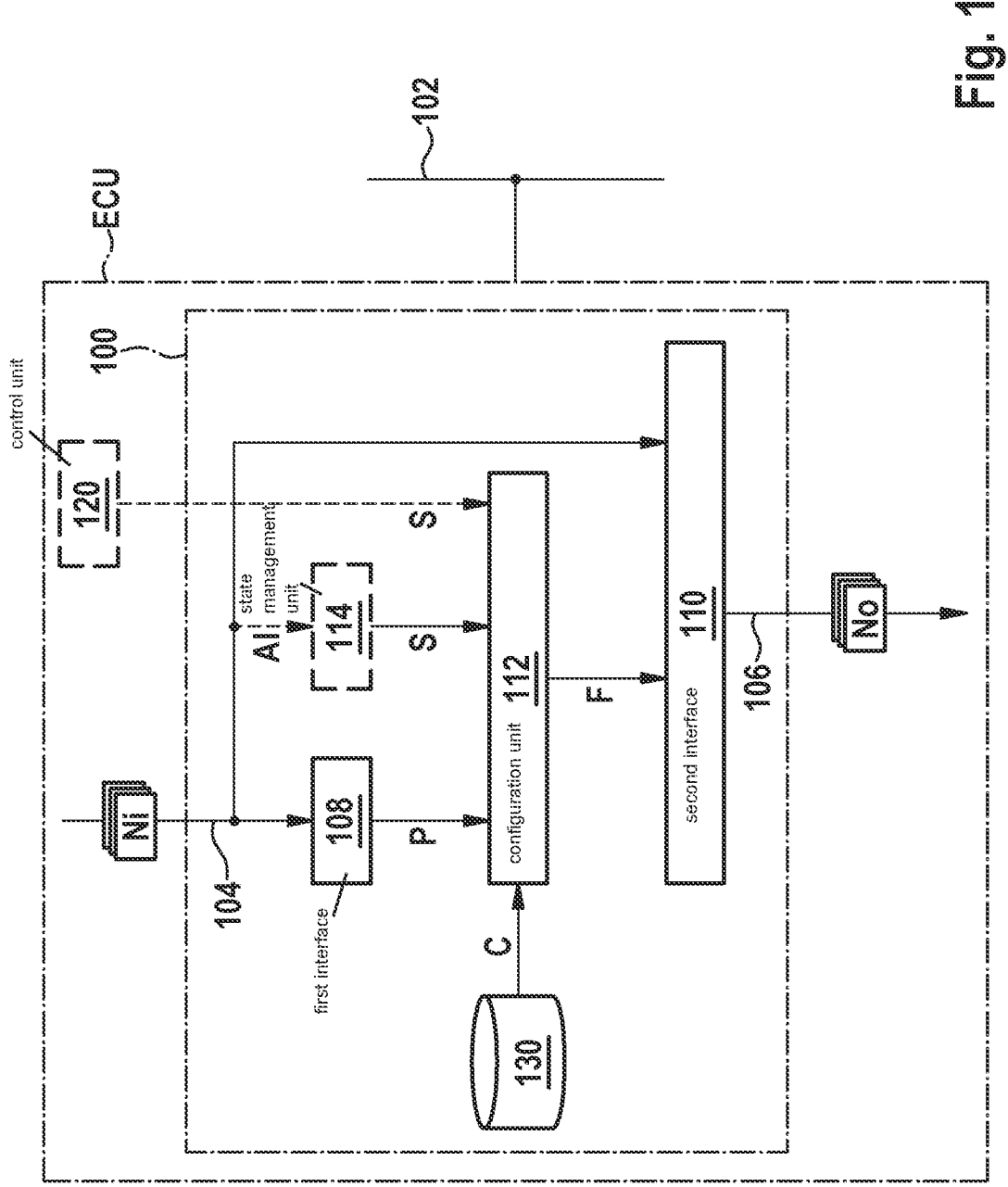
FIG. 1 shows a user of a serial bus in schematic form, in accordance with an example embodiment of the present invention.

FIG. 1 shows a user ECU of a serial bus 102 in schematic form. A communication module 100 of user ECU of serial bus 102 is configured to receive a first message stream 104, encompassing a multitude of messages Ni, with the aid of a first interface 108. Communication module 100 is configured to provide a respective message Ni of first message stream 104 as message No of a second message stream 106, as a function of a configuration state S and as a function of at least one property P of the respective message Ni of first message stream 104, with the aid of a second interface 110.

Serial bus 102 is the controller area network (CAN) bus, for example. CAN is a serial multi-master bus standard for connecting users, in particular electronic control units of motor vehicles, also referred to as nodes. Two or more users in the CAN network are required for communication. The complexity of the node may range from a simple I/O unit to an embedded computer with CAN interface and software. The user may also be a gateway, which allows an all-purpose processor (such as, e.g., a laptop) to communicate via a USB port or an Ethernet port with the users in the CAN network. All users are connected to one another via a two-wire bus, for example.

In one example, first message stream 104 is received as an egress message stream from a control unit via a first interface, second message stream 106 being transmitted on bus 102 as an egress message stream via a second interface.

In one further example, first message stream 104 is received as an ingress message stream from bus 102 via the second interface, second message stream 106 being transmitted as an ingress message stream to the control unit via the first interface.

In one further example, first message stream 104 is made up of an ingress and an egress message stream, second message stream 106 also being made up of an ingress and an egress message stream. With this, a filter mechanism is provided, which checks incoming and outgoing communication, taking the active configuration state into consideration, and, depending on the selected configuration state, allows or blocks the communication.

A forwarding indicator F is ascertained with the aid of a configuration unit 112. Per message Ni of first message stream 104, forwarding indicator F is ascertained as a function of configuration state S of communication module 100 and as a function of the at least one property P of the respective message Ni. The respective message Ni of first message stream 104 is only provided as message No of second message stream 106 with the aid of second interface 110 when forwarding indicator F indicates this provision.

Configuration state S of communication module 100 is received from control unit 120 and provided to configuration unit 112.

In an alternative or additional example, configuration state S is ascertained by a state management unit 114 of communication module 100. A message Ni, which encompasses at least one activation indicator AI, is received by state management unit 114, and configuration state S of communication module 100 is ascertained as a function of the at least one activation indicator AI.

A multitude of configurations C ascertained in advance are stored on a memory unit 130. As a function of state S, configuration unit 112 selects a corresponding configuration C, based on which it ascertains forwarding indicator F for each message Ni. Each respective one of configurations C encompasses a multitude of entries. Each respective one of the entries positively defines which property P of message Ni of first message stream 104, in which configuration state S, a forwarding indicates a received message Ni of first message stream 104 as message No of second message stream 106. For example, the at least one property P of the respective message Ni encompasses an object identifier, which characterizes the content of message Ni, and/or a transport direction of message Ni.

Communication module 100 is part of a CAN controller, for example, in particular of a CAN message handler. Predefined configurations C are required for the implementation, which enable a state-based filtering of the communication and are specified during the development and introduced into the CAN controller.

Figure 2:
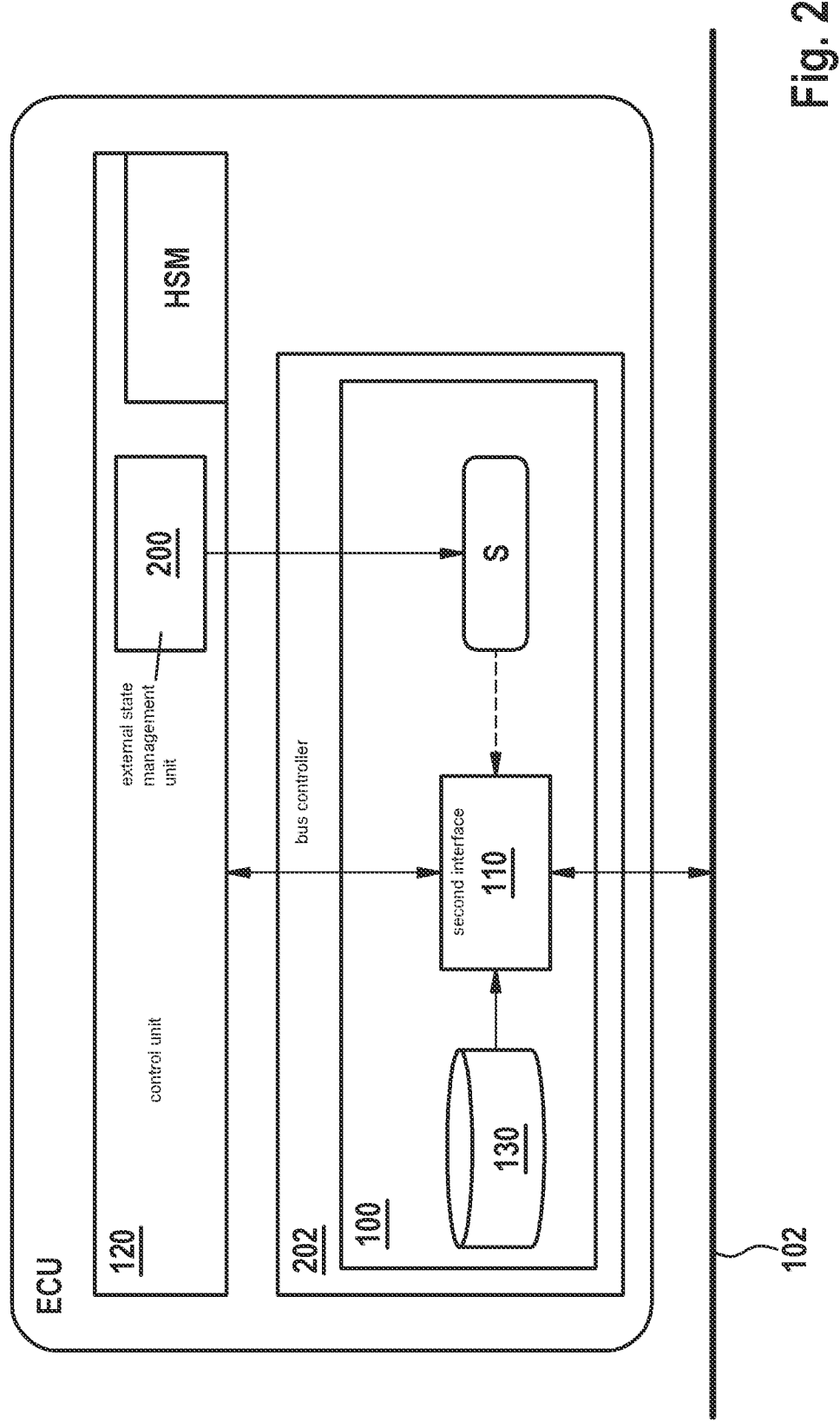
FIGS. 2 and 3 each show an example of the user in accordance with the present invention.

FIG. 2 shows an example of user 102. The management of configuration state S takes place by an external state management unit 200, which is situated in control unit 120, also referred to as host controller, or a hardware security module HSM. For this purpose, communication module 100, which, shown by way of example, is part of a bus controller 202, provides a fixedly defined interface for transmitting the instantaneous configuration state S to communication module 100. The communication is monitored based on configuration state S made available.

In Table 1, exemplary filtering criteria are linked to configuration state S. This means that one line of Table 1 is activated for the selected configuration state S. If the conditions of columns 1 through 5 apply to one of the received egress or ingress messages, the corresponding action in column 6 is executed for this one message. All other messages are held back, i.e., blocked, according to line 2.

TABLE 1

| CAN ID | Direction | Control Field | Value | Configuration State S | Action |
|---|---|---|---|---|---|
| * | * | * | * | * | block |
| 1 | Tx | PT | CAN-XL | Normal CAN XL | allow |
| 1 | Tx | PT | UDS | Diagnostic CAN XL | allow |
| 1 | Tx | PT | CAN-XL | Diagnostic CAN XL | transition |
| 2 | Rx | PT | CAN-XL | Normal CAN XL | allow |
| 2 | Rx | PT | UDS | Normal CAN XL | transition |
| 2 | Rx | PT | Ethernet | Normal CAN XL | transition |
| 2 | Rx | PT | Ethernet | Ethernet CAN XL | allow |
| 2 | Rx | PT | SOME/IP | Ethernet CAN XL | allow |
| 2 | Rx | PT | DoIP | Diagnostic CAN XL | allow |
| 2 | Rx | PT | Ethernet | Diagnostic CAN XL | transition |
| 3 | Rx | PT | CAN-XL | Normal CAN XL | allow |
| 4 | Tx | PT | Ethernet | Ethernet CAN XL | allow |

Figure 3:
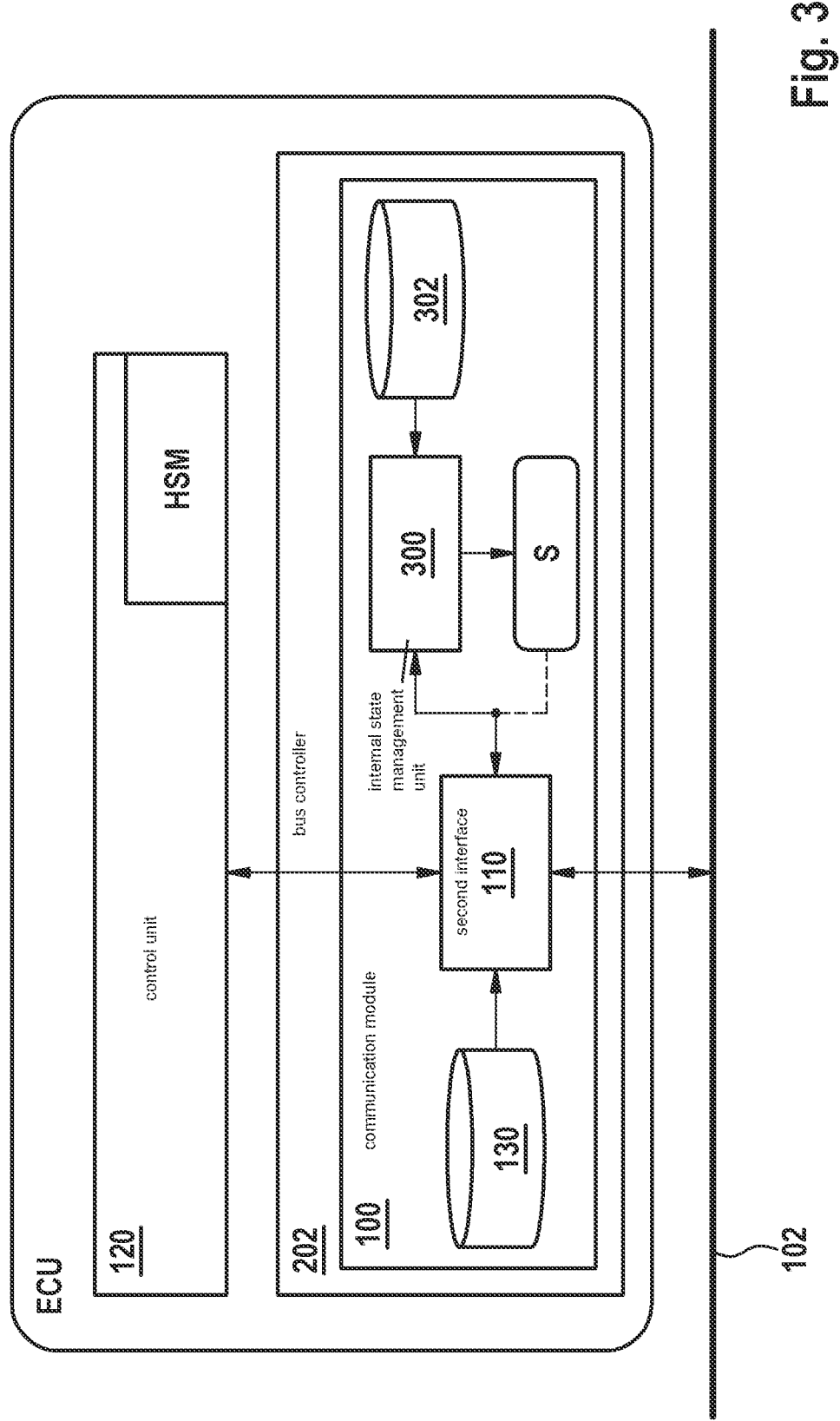

FIG. 3 shows an example of user 102. In this example, communication module 100 manages configuration state S with the aid of an internal state management unit 300. State management unit 300 selects a configuration state S from a number of configuration states stored on a memory element 302. A state change occurs when a message comes in or goes out which corresponds to a previously determined pattern. It is thus specified in advance which configuration states S exist, and by which activation indicator a change or a state transition is executed. In one example, it is necessary that a multitude of ingress or egress messages have a certain respective predetermined pattern to trigger a state transition.

Tables 2 and 3 show exemplary filtering criteria for a respective configuration state "Normal CAN XL" and "Diagnostic CAN XL." This means that initially one of the two tables shown by way of example is selected for the selected configuration state S. If the conditions of columns 1 through 4 apply to one of the received egress or ingress messages, the corresponding action in column 5 is executed for this one message. All other messages are held back, i.e., blocked, according to line 2.

TABLE 2

Configuration State: Normal CAN XL

| CAN ID | Direction | Control Field | Value | Action |
|---|---|---|---|---|
| * | * | * | * | block |
| 1 | Tx | PT | CAN-XL | allow |
| 1 | Tx | PT | CAN-XL | transition |
| 2 | Rx | PT | CAN-XL | allow |
| 3 | Rx | PT | CAN-XL | allow |

TABLE 3

Configuration State: Diagnostic CAN XL

| CAN ID | Direction | Control Field | Value | Action |
|---|---|---|---|---|
| * | * | * | * | block |
| 1 | Tx | PT | UDS | allow |
| 1 | Tx | PT | CAN-XL | transition |
| 2 | Rx | PT | DoIP | allow |
| 2 | Rx | PT | Ethernet | transition |

TABLE 4

Configuration State: Ethernet CAN XL

| CAN ID | Direction | Control Field | Value | Action |
|---|---|---|---|---|
| * | * | * | * | block |
| 2 | Rx | PT | SOME/IP | allow |
| 2 | Rx | PT | Ethernet | allow |
| 4 | Tx | PT | SOME/IP | allow |

Figure 4:
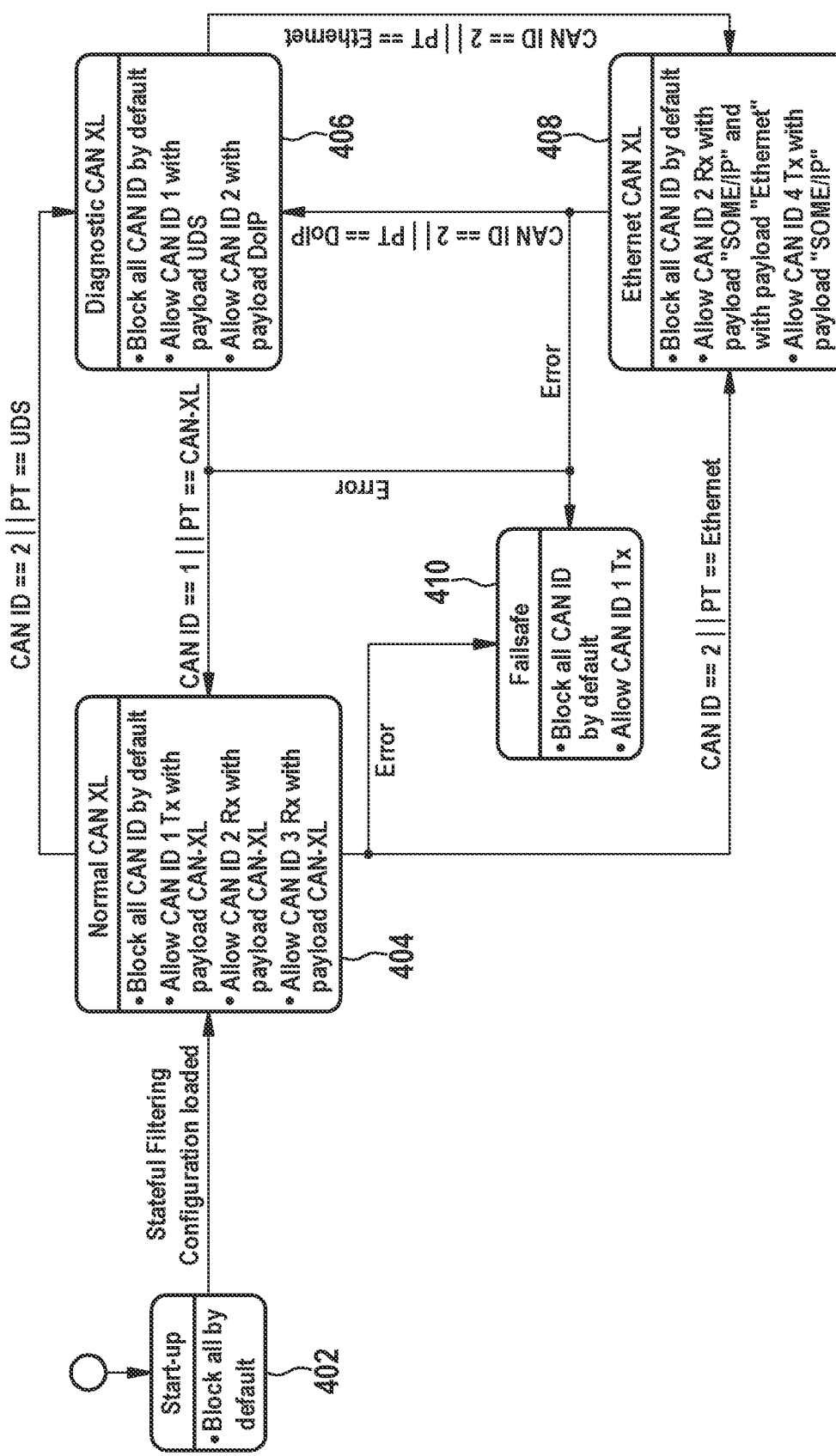
FIG. 4 shows a schematic state transition diagram in accordance with an example embodiment of the present invention.

FIG. 4 shows an exemplary schematic state transition diagram. After a starting state 402, the communication module then transitions into a first configuration state 404 when the communication module is initialized. All messages are blocked prior to the transition into first state 404.

A switch is made into a diagnosis configuration state 406 when the CAN ID has the value "2" or the control field has the value "UDS." A switch is made into an Ethernet configuration state 408 when the CAN ID has the value "2" or the control field has the value "Ethernet." A switch is made into an error configuration state 410 when an error is established.

The diagnosis of the vehicle by an external diagnostic tester is only permissible, for example, when the vehicle is in the resting state. External diagnostic testers may connect to user ECU. However, a diagnostic communication which is initiated by user ECU itself as a vehicle-internal control unit is not permissible. For this reason, the status change into diagnostic configuration state 406 for the diagnostic communication by the communication module is only permitted when initially a diagnostic message was received from the bus.

Another example relates to the transmission of SOME/IP messages. In this example, the payload type indicates that a "SOME/IP" message is transmitted in the payload. This requires the prior establishment of an Ethernet connection, i.e., payload type is "UDP" or "TCP." If a manipulated control unit transmits a message with payload type "SOME/IP" without an Ethernet connection having previously been established, the communication module prevents this attack by not switching into configuration state 408. The communication module identifies that a transition from configuration state "Normal CAN XL" into state "Ethernet CAN XL" has not yet taken place, and thus blocks the incoming as well as outgoing "SOME/IP" messages.

What is claimed is:

1. A communication module for a user of a serial bus, the communication module configured to:
   receive a first message stream, encompassing a multitude of messages, via a first interface;
   provide, via a second interface, each respective message of the first message stream as a message of a second message stream, as a function of a configuration state of the communication module and as a function of at least one property of the respective message of the first message stream, wherein:
   a first configuration state corresponds to a first set of filtering criteria,
   a second configuration state corresponds to a second set of filtering criteria different than the first set, and
   the communication module is configured to switch between the first and second configuration states depending on a value of at least one activation indicator in a received message.

2. The communication module as recited in claim 1, wherein the communication module is configured to:
   ascertain a respective forwarding indicator for each respective message of the first message stream, as a function of the configuration state of the communication module and as a function of the at least one property of the respective message, with the aid of a configuration unit; and
   provide the respective message of the first message stream as a message of the second message stream only when the respective forwarding indicator indicates the provision.

3. The communication module as recited in claim 1, wherein the communication module is configured to receive the configuration state of the communication module from a control unit.

4. The communication module as recited in claim 1, wherein the communication module is configured to:
   ascertain the configuration state of the communication module as a function of the at least one activation indicator with the aid of a state management unit.

5. The communication module as recited in claim 1, wherein a multitude of configurations ascertained in advance are stored on a memory unit.

6. The communication module as recited in claim 5, wherein each configuration of the configurations encompasses a multitude of entries, which each positively define which at least one property of the message of the first message stream, in which configuration state, indicates a forwarding of a received message of the first message stream as a message of the second message stream.

7. The communication module as recited in claim 1, wherein the at least one property of the respective message encompasses an object identifier, which characterizes content of the message.

8. The communication module as recited in claim 1, wherein the at least one property of the respective message includes a transport direction of the respective message.

9. The communication module as recited in claim 1, wherein the communication module is configured to:
   receive the first message stream from a control unit; and
   transmit the second message stream on the bus.

10. The communication module as recited in claim 1, wherein the communication module is configured to:
    receive the first message stream from the bus; and
    transmit the second message stream to a control unit.

11. The communication module as recited in claim 1, wherein the communication module is configured to:
    receive the first message stream from the bus and from a control unit; and
    transmit the second message stream to the control unit and to the bus.

12. The communication module as recited in claim 1, wherein the configuration state includes one of Normal CAN XL, Diagnostic CAN XL, and Ethernet CAN XL.

13. A control unit for a motor vehicle, comprising:
    a communication module for a serial bus of the motor vehicle, the communication module configured to:
    receive a first message stream, encompassing a multitude of messages, via a first interface; and
    provide, via a second interface, each respective message of the first message stream as a message of a second message stream, as a function of a configuration state of the communication module and as a function of at least one property of the respective message of the first message stream, wherein:
    a first configuration state corresponds to a first set of filtering criteria,
    a second configuration state corresponds to a second set of filtering criteria different than the first set, and
    the communication module is configured to switch between the first and second configuration states depending on a value of an activation indicator in a received message.

14. The control unit as recited in claim 13, wherein the configuration state includes one of Normal CAN XL, Diagnostic CAN XL, and Ethernet CAN XL.

15. A method for operating a communication module of a user of a serial bus, the method comprising the following steps:
    receiving, via a first interface, a first message stream encompassing a multitude of messages; and
    providing, with the aid of a second interface, each respective message of the messages of the first message stream as a message of a second message stream, as a function of a configuration state of the communication module and as a function of at least one property of the respective message of the first message stream, wherein:
    a first configuration state corresponds to a first set of filtering criteria,
    a second configuration state corresponds to a second set of filtering criteria different than the first set, and
    the communication module is configured to switch between the first and second configuration states depending on a value of an activation indicator in a received message.

16. The method as recited in claim 15, the method further comprising:
    ascertaining a respective forwarding indicator for each respective message of the first message stream, as a function of the configuration state of the communication module and as a function of the at least one property of the respective message, with the aid of a configuration unit; and providing the respective message of the first message stream as a message of the second message stream only when the respective forwarding indicator indicates the provision.

17. The method as recited in claim 15 wherein the configuration state includes one of Normal CAN XL, Diagnostic CAN XL, and Ethernet CAN XL.

* * * * *